July 22, 1969  R. P. FREEDMAN ET AL  3,456,715
APPARATUS FOR THE MEASUREMENT OF LEVELS OF HIGH TEMPERATURE MATERIALS
Filed Aug. 16, 1966  3 Sheets-Sheet 1
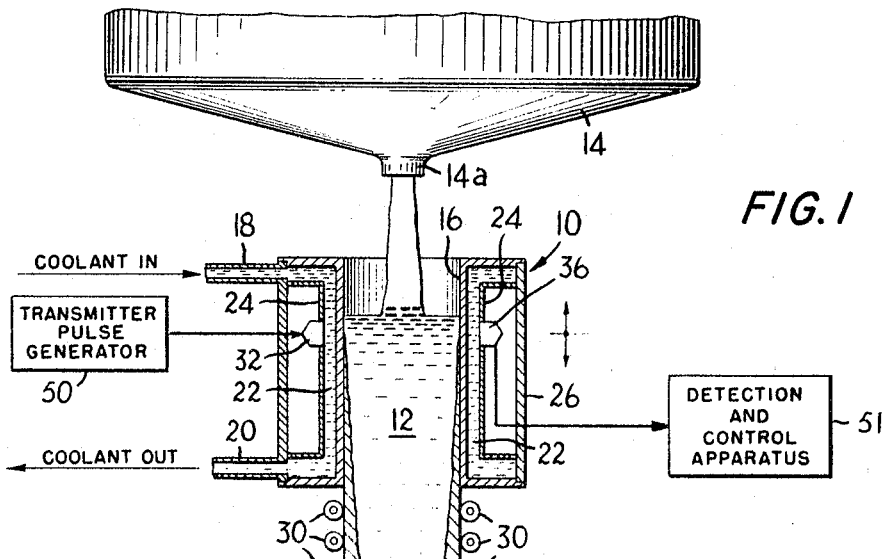
FIG. 1
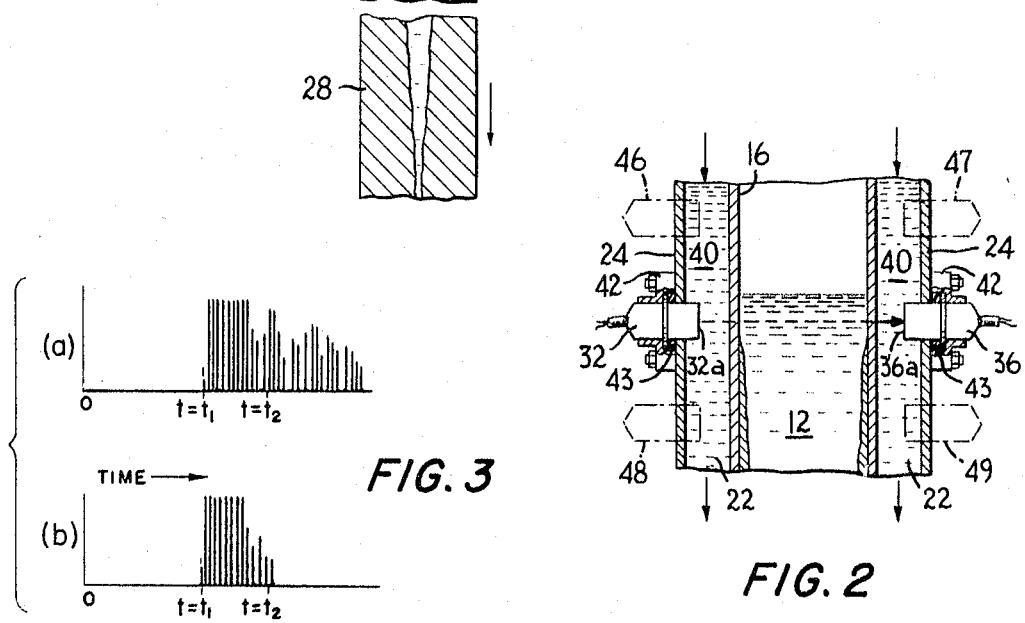
FIG. 2
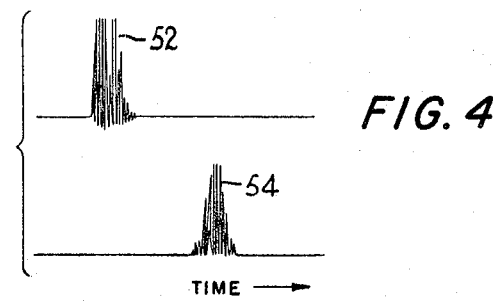
FIG. 3
FIG. 4
INVENTORS.
ROBERT P. FREEDMAN &
MARTIN J. FETNER
BY
their ATTORNEYS

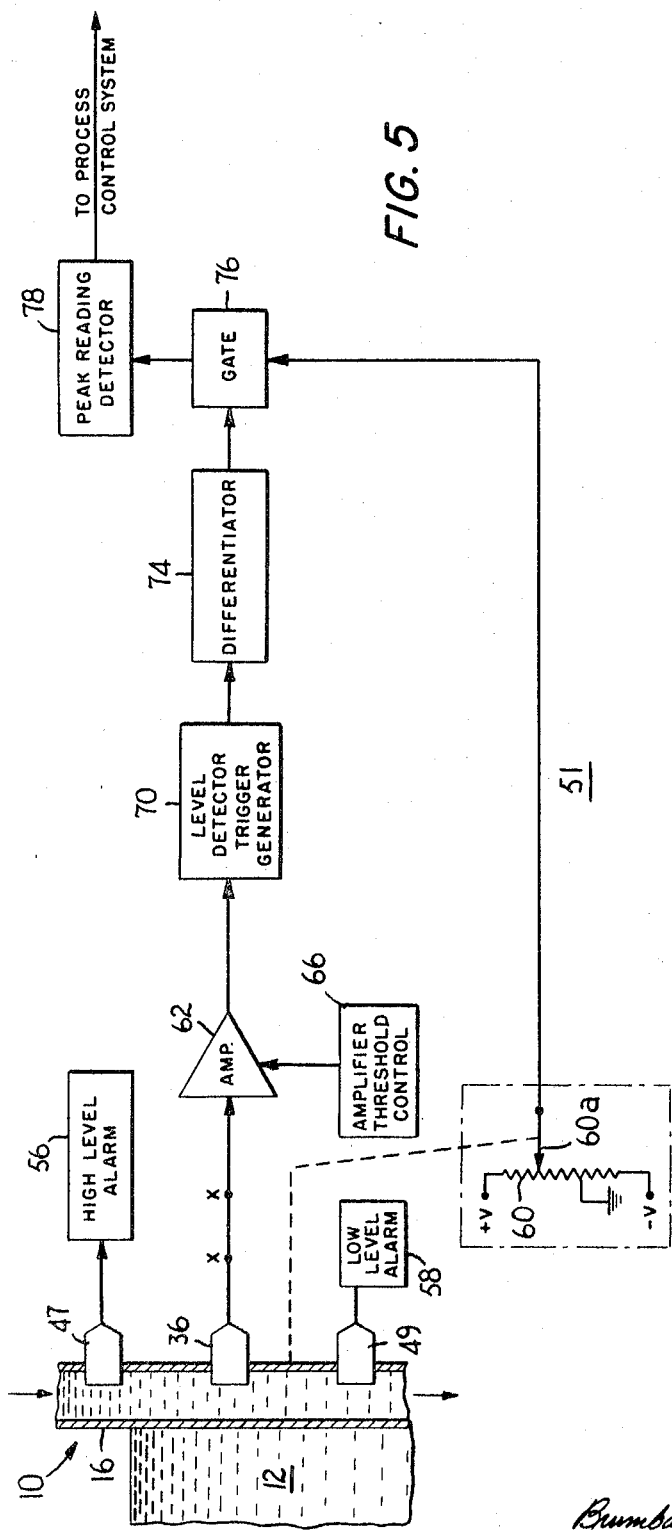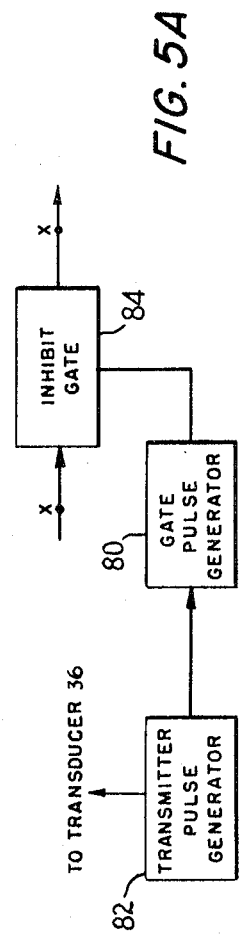

United States Patent Office 3,456,715
Patented July 22, 1969

3,456,715
APPARATUS FOR THE MEASUREMENT OF LEVELS OF HIGH TEMPERATURE MATERIALS
Robert P. Freedman, Ledyard, and Martin J. Fetner, New London, Conn., assignors to General Dynamics Corporation, New York, N.Y., a corporation of Delaware
Filed Aug. 16, 1966, Ser. No. 572,790
Int. Cl. B22c 19/04
U.S. Cl. 164—155    4 Claims

ABSTRACT OF THE DISCLOSURE

The disclosure is of a means for detecting the level of a substance in a container, such as a reciprocating continuous casting mold, by transmitting acoustic energy through the container to generate a signal representative of the substance at a reference level. A second electrical signal is responsive to the reciprocation of the container representing its displacement from a reference position. The combination of the first and second signals gives an output signal indicative of the level of the substance.

---

This invention relates to the determination of the level of high temperature substances in containers or molds. More particularly, the invention deals with the measurement by acoustic energy transmission of the level of materials such as molten metals in vessels or continuous casting molds.

In continuous metal casting processes, it is important to control the level of molten metal within the continuous casting pipe or mold with a satisfactory degree of precision. Under common present practice, radiation devices associated with the mold are used to sense the level of molten materials within the mold by detecting the radiation attenuation occurring between a radiation source and detector. The measurements obtained from the radiation detector are indicative of the amount of radiation absorbed by the material between the radiation source and the detector, the absorption increasing considerably when the metal in the mold reaches the level of the path connecting the detector and the source. Although radiation measurements give a satisfactory indication of the molten metal level within a continuous metal casting mold, the radiation absorbed by the metal causes contamination of the metal product. The amount of contamination may be within tolerable limits for many uses of the metal product, but is, on the other hand, strictly unsatisfactory for other uses, such as canning or food processing where no contamination is permitted.

Another known method for detecting the level of liquid high-temperature metals is to locate a series of thermocouples in the wall of a casting mold to give indications of the temperature gradient, as well as of abrupt changes in temperature at the side of the mold. This scheme is also acceptable, but has the disadvantage of requiring a considerable amount of calibration and a fairly complex mold structure to house the various thermocouples.

It is therefore among the objects of this invention to provide improved acoustic methods and apparatus for determining the level of high-temperature substances within a container or mold.

A further object of the invention is to provide improved methods and apparatus for measuring molten metal levels in a continuous casting process.

Another object of the invention is to provide improved level determining apparatus and methods wherein acoustic energy is coupled to the interior of a container by a coolant flowing between a wall of the container and an acoustic transducer.

A still further object of this invention is to provide an improved electronic system for measuring the level of a substance within a container.

Yet another object of the invention is to provide apparatus and systems for sampling the level of a substance contained by a mold or container which is moving relative to the level of the substance.

Briefly, these and other objects of the invention are attained by disposing electroacoustic transducer means for transmission of acoustic energy through a coolant flowing continuously between the transducer means and the wall of a mold or vessel containing the material whose level is to be measured. When the level of a substance reaches the level at which the transducer is disposed, an electrical signal is developed which has a characteristic indicating the presence of the material at that level. In a preferred embodiment, the electroacoustic transducer means includes both a transmitter and a receiver, disposed at opposite sides of the vessel or mold, which together are operable to generate an electrical signal in response to the detection of acoustic energy transmitted through the space occupied by the material.

As applied to measuring the level of a substance relative to the wall of a moving mold in continuous casting processes, the invention includes apparatus responsive to the motion of the mold for developing an electrical signal representing the displacement of the container from a longitudinal reference position. The displacement signal and the signal generated by the transducer means are then fed to means jointly responsive to these signals to develop an output signal which is proportional to the electrical displacement signal when the level of the substance reaches a predetermined position relative to the mold.

For a better understanding of these and other objects of the invention, as well as the further advantages thereof, reference may be made to the following detailed description and to the accompanying drawings, wherein:

FIGURE 1 is a schematic representation of a basic system for determining the level of molten metal in a continuous casting mold in accordance with the invention;

FIGURE 2 is an enlarged cross-sectional view of a portion of the mold shown in FIGURE 1;

FIGURE 3 is a representative graph of one type of electrical signal which may be developed by the system of FIGURE 1, using acoustic pulse echo techniques;

FIGURE 4 is a graph of typical electrical signals of the type obtained from the system of FIGURE 1 when acoustic energy is transmitted through the mold between an acoustic transmitter and receiver;

FIGURE 5 is an electrical block diagram of a portion of the system illustrated in FIGURE 1;

FIGURE 5A is an electrical block diagram of apparatus for use in conjunction with the FIGURE 5 system when acoustic pulse echo techniques are employed for determining the level of a substance in the mold;

Figure 6:
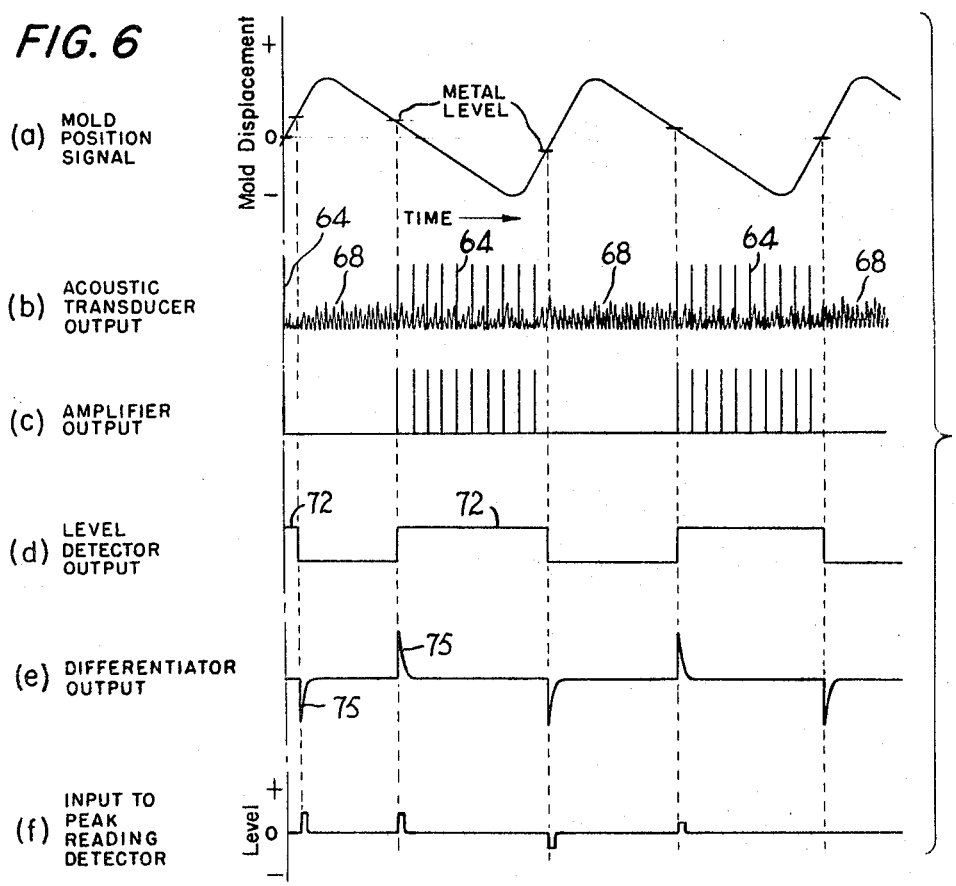
FIGURE 6 is a graph of electrical signals developed within the system of FIGURE 5.

For the purpose of illustration, the invention will be described in connection with the measurement of molten metal levels during a continuous casting process. In FIGURE 1, a continuous casting mold 10 receives molten metal 12 from the nozzle 14a of the continuous casting tundish 14 disposed above the mold 10. The mold 10 includes a mold wall or pipe 16 which is cooled by a continuous flow of coolant, such as water, through an intake manifold 18 and an outlet manifold 20. The manifolds 18 and 20 each communicate, at opposite ends of the mold 10, with a passage or passages 22 defined between the mold wall 16 and baffle plates 24 arranged in the mold to direct the flow of fluid against the interior of the mold wall 16. Forming part of the mold 10 is a shell 26 for housing the mold wall 16, baffles 24, and other structures which are not shown.

As the molten metal 12 flows into the container or mold 10, it is cooled upon coming into contact with the mold wall 16, which is maintained at a relative low temperature by the continuous flow of coolant, and a thin skin of solid metal is formed as the slab or cast piece is continuously withdrawn from the mold. The solidified form 28 exiting from the bottom of the mold passes between sets of rollers 30 which prevent the newly formed thin skin of solid metal from expanding and rupturing due to the static pressure of the still-molten core of the form. In practice, the form is also subjected to a water jet spray (not shown) for accelerating cooling of the moving solid form.

It should be noted that in continuous casting, the mold 10 is given a reciprocating motion along its axis, as indicated by the arrows, so that static friction between the moving slab 28 and the wall 16 is present only during the short instant of time when the mold reverses direction. In this manner, a reduced (sliding) coefficient of friction exists between the slab 28 and the mold wall 16 during most of the oscillatory cycle of the mold 10, thus facilitating easy withdrawal of the solid metal form 28 throughout the duration of the casting run.

It has been determined that optimum casting results can be obtained from a mold having a length of about 2 to 3 feet. Because of the relatively short length of the mold, the rate of withdrawal of the solid form 28 from the mold 10 and the level of the molten metal 12 within the mold must be carefully correlated and controlled so that, on the one hand, the static pressure of the molten metal core in the form 28 does not become excessive to cause buckling or rupture of the solid skin surrounding the molten core and so that, on the other hand, the form is not withdrawn from the mold too rapidly or too slowly to cause distortion. It is therefore quite important to exert close control of the molten metal level within the casting mold throughout the casting process. In accordance with the present invention, the molten metal level is detected through the employment of acoustic wave transmission, in the manner now to be described.

As best seen in FIGURE 2, electroacoustic transducers 32 and 36, which may be of the magnetostrictive or electrostrictive type, are mounted to the baffle 24 for exposure of the active faces 32a, 36a of the transducers to the flow of liquid coolant 40 passing between the mold wall 16 and the baffle 24. In accordance with one novel feature of the invention, the coolant 40 serves both to maintain the temperature of the transducers within their operable temperature limits and to acoustically couple the transducers to the wall 16 of the mold. Usually, water is used for the coolant and is passed through the mold 10 at a rate of about 1200 gallons per minute in order to obtain maximum cooling of the molten metal at the mold wall 16. Conventional mounting of the transducers on the wall 16 wherein a block of solid acoustic transmission material may be interposed between the wall 16 and the associated transducer is, in general, to be avoided, since the block restricts the flow of coolant 40 past the wall, which is usually constructed of copper, and thus results in burnout of the portion of the wall in contact with the block due to the high temperature effects of the molten metal.

A representative method of mounting the transducers to the baffle 24 is illustrated in FIGURE 2, wherein annular collars 42 bolted to the baffle 24 clamp the transducers 32 and 36 in place. In general, the transducers 32, 36 are located at a longitudinal position in the mold which corresponds to the desired level of the molten metal, although this is not absolutely necessary. Disposed between the transducers 32 and 36 and the annular clamps 42 are sealing high-temperature-resistant rings 43 which prevent leakage when the transducers are subjected to pressurized flow of the coolant 40. Preferably, additional pairs of transmitting and receiving transducers indicated by the phantom outlines 46–49, are located above and below the transducers 32, 36. These pairs of transducers 46, 47 and 48, 49 may be used to detect the level of the molten metal 12 at its maximum and minimum limits, respectively.

In the transducer arrangement shown in FIGURE 2, one of the transducers of each pair, e.g., transducer 32, is employed for transmitting acoustic energy and the other transducer 36 for detecting the intensity of acoustic energy transmitted through the coolant 40, the mold wall 16, and the cavity of the mold 10. The transmitting transducer 32 is periodically excited by a transmitter pulse generator 50 (FIGURE 1), causing the transducer to emit bursts of acoustic energy toward the receiving transducer 36. The transducer 36 generates an electrical signal in response to the acoustic energy received thereby for application to detection and control apparatus 51 to be described shortly in detail. In this connection, it should be mentioned that the transducer 32 can also be excited with a periodic waveform, such as a sinusoidal waveform, wherein the amplitude of acoustic oscillations is detected by the receiving transducer 36, operating in conjunction with detection equipment such as disclosed, for example, in U.S. Patent Nos. 2,990,543 and 3,019,650 to Rod and Worswick, respectively.

It should be noted, in addition, that a single transducer, e.g., the transducer 36, disposed at one side of the mold can also be used, in which case acoustic pulse echoes are used to determine the presence or absence of molten metal at a predetermined level in the mold 10. With this arrangement, the transmitter pulse generator 51 will be connected to energize the transducer 36, and signal gating apparatus employed to select the portion of the transducer output signal representing acoustic pulse echoes, as described more fully in connection with FIGURE 5A. It is also feasible, of course, to use separate receiving and transmitting tranducers at the same side of the mold wall 16.

FIGURE 3 depicts typical electrical signals of the type developed in response to transmitted and received acoustic pulse echoes. In graph (a), the pulses appearing between the times $t_1$ and $t_2$ represent the initial transmitted pulse and its repeated reflections from the mold wall 16. The electrical pulses occurring after the time $t_2$ are generated by the transducer upon receiving additional multiple reflections from the mold wall in the absence of molten metal in the vicinity of the level of the transducer. Graph (b) illustrates the nature of the generated signal when molten metal reaches the level of the transducer. As seen there, the pulses substantially terminate after the time $t_2$, owing to the presnce of molten metal which presents a damping medium for the burst of acoustic energy produced by the transducer.

FIGURE 4 is a graph, on an expanded time scale, of typical electrical signals generated by the pair of transducers 32, 36 shown in FIGURE 2. In FIGURE 4, a pulse burst 52 represents electrical excitation of the transmitter 32 which generates a similar burst of acoustic energy, and a second pulse or group of pulses 54 appearing a finite time thereafter is generated by the electro-acoustic receiver 36 when the level of molten metal in the mold 10 exceeds the level at which the transmitting and receiving transducers 32, 36 are disposed. When the level of the molten metal drops below the path of electroacoustic transmission shown generally by the dashed line in FIGURE 2, the cavity of the mold presents a high acoustic impedance to the transmitted acoustic waves, which do not reach the receiver 36 with enough strength to effect the generation of an appreciable electrical indication. As the level of the molten metal rises above the transmission path between the transducers 32, 36, the molten metal provides a transmission medium to the acoustic energy transmitted by the transducer 32, and a portion of this acoustic energy arrives at the transducer 36, which generates the burst of pulses 54. It is observed that when either acoustic pulse echoes or the arrival of acoustic energy transmitted through the medium is detected, an electrical signal having a characteristic indicative of the presence or absence of molten metal at predetermined level is developed.

Referring to FIGURE 5, there is shown a detection system 51 for developing an analog signal representing the level of the molten metal within the mold 10. The receiving transducer 47 is employed for detecting abnormally high levels of the molten metal, and the receiving transducer 49 for detecting abnormally low levels of the metal. The transducers 47 and 49 each feed an alarm device 56 and 58, respectively, which may either produce a warning indication or develop signals for automatically shutting down the casting process. As previously mentioned, the mold 10 is given reciprocating motion during the casting process, the stroke of the mold being about two inches at an oscillatory frequency of about one cycle per second. During casting, the transmitter 32 is pulsed by the generator at a repetition frequency of about 1,000 cycles per second or less, the exciting pulse for the transducer having a frequency of about 1 to 5 megacycles/sec. In this manner, bursts of acoustic energy pulses (see FIGURE 4) of high frequency, i.e., about 1 to 5 megacycles, are transmitted into the mold space about 1,000 times per cycle of mold oscillation.

Mechanically coupled to the moving mold 10, and therefore the receiving transducer 36, is the movable arm 60a of the center-tapped potentiometer 60, the end terminals of which are supplied with positive and negative reference voltages. For purposes of explanation, it is assumed that the arm 60a is located at the center tap of the potentiometer when the transducer 36 is at a reference level corresponding to the desired absolute level of the molten metal 12. The electrical signal (FIGURE 6(a)) developed at the potentiometer arm 60a, therefore, is an analog voltage representative of the displacement of the longitudinal position of the transducer 36 from a reference level which, in the case described, is a point midway between the upper and lower displacement limits of the mold.

Connected to the receiving transducer 36 is an amplifier 62 which receives the transmitted acoustic pulses 64 (FIGURE 6(b)), similar to those designated at 54 in FIGURE 4, whenever the level of the metal in the mold 10 exceeds the longitudinal position of the transducer 36. As illustrated, the acoustic transducer output is comprised of initial pulses (64) succeeded by a large number of smaller-amplitude reply pulses. Actually, as many as 500 or more such initial pulses may occur in any single cycle of mold oscillation, but for clarity, only a limited number of initial pulses are shown. In FIGURE 6(a), the horizontal lines crossing the analog potentiometer signal indicate the absolute level of the metal at the particular instant of time when this level coincides with the position of the transducer 36. An amplifier threshold control unit 66 is connected to the amplifier 62 to control the minimum amplitude of electrical signals from the transducer 36 which will be amplified and passed to the amplifier output (FIGURE 6(c)). The signal threshold determined by the unit 66 prevents noise or spurious signals from the transducer 36, such as those indicated at 68 in FIGURE 6(b), from reaching subsequent electronic circuitry.

The output of the amplifier 62 is connected to a signal level-sensitive trigger generator 70, which develops pulses 72 (FIGURE 6(d)) having durations corresponding to the lengths of time during which the high frequency electrical pulses at the output of the amplifier 62 are present. It is understood that the trigger generator 70 may include an input filter for the purpose of rendering the generator responsive to series of high frequency pulses 64, rather than each individual pulse. The square pulse 72 is passed to a differentiator 74, the output signal of which comprises spikes 75 (FIGURE 6(e)) generated at times corresponding to the leading and trailing edges of the pulses 72 and passes them to the control terminal of a conventional signal gate 76. The analog signal (FIGURE 6(a)) at the arm 60a of the potentiometer feeds the input terminal of the gate 76, and the instantaneous amplitude of this signal is gated to a peak reading detector 78 whenever a positive or negative pulse appears at the output of the differentiator 60a, as shown in FIGURE 6(f). The signal at the peak reading detector 78 may then be used to regulate the casting control system (not shown) such that the rate at which the solid metal form 28 is withdrawn from the mold is either increased or decreased, or alternatively, to control the flow rate of molten metal into the mold.

From the foregoing, it will be understood that, in the usual case where the metal level is within the prescribed limits, the receiving transducer 36 rises above and falls below the molten metal level during each cycle of mold oscillation, resulting in a sampling of the molten metal level twice during each oscillation cycle of the mold, or approximately every one-half second.

FIGURE 5A illustrates additional electronic equipment which is desirably used with the FIGURE 5 system when the transducer 36 alone is used for implementing acoustic pulse echo measurements. When so used, the system includes a gate pulse generator 80 for generating a short pulse in response to a transducer excitation pulse from the transmitter pulse generator 82. This short pulse is preferably initiated at the time $t_1$ (FIGURE 3) and extinguished at $t_2$. The pulse at the output of the gate pulse generator 80 is fed to an inhibit gate 84, which is connected between the points X—X in FIGURE 5. Upon receiving the pulse from the generator 80, the gate 84 is actuated to block the passage to the amplifier 62 of the burst of acoustic pulses occurring between the times $t_1$ and $t_2$. The inhibit gate 84 thus isolates the amplifier 62 from the transducer 36 during the period when the transducer 36 is energized by the pulse generator 80, and completes the circuit to the amplifier 62 thereafter.

Figure 7:
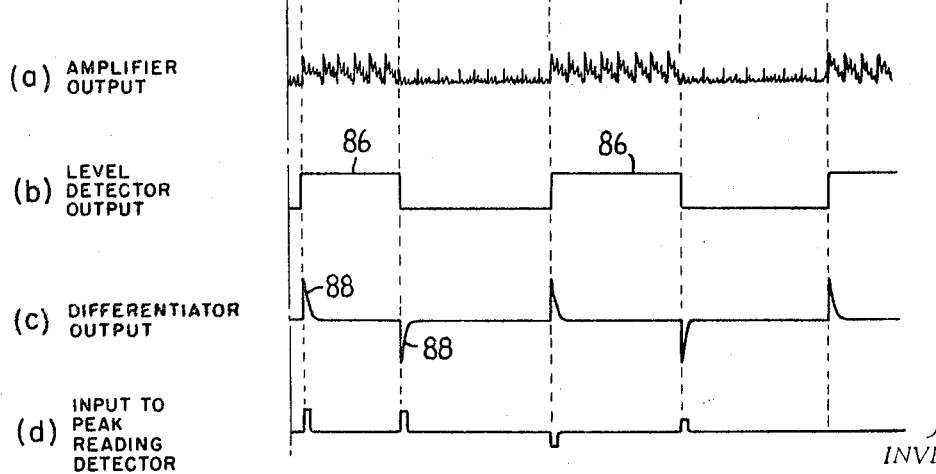
FIGURE 7 is a graph of electrical signals developed by the combined system of FIGURES 5 and 5A when acoustic pulse echo techniques are employed.

FIGURE 7 shows the corresponding electrical signals, on the same time scale as FIGURE 6, which would be developed by the combined system of FIGURES 5 and 5A under the assumed metal level conditions depicted in FIGURE 6(a). In FIGURE 7(a) it is observed that the series of higher amplitude electrical pulses from the amplifier 62, representing multiple reflections from the mold wall 16, are present whenever the position of the transducer 36 is above the level of the moldten metal. As in FIGURE 6(b), only a limited number of acoustic transducer pulse frames have been shown. In this case, the level detector 70 is triggered to develop a square wave pulse 86 (FIGURE 7(b)), during the times when the multiple reflections are received. Differentiating the pulses 86 from the trigger generator 70 yields gating pulses 88 (FIGURE 7(c)) which occur at exactly the same instants of time as the gating pulses 75 obtained from the FIGURE 5 system. The signal fed to the peak reader 78 (FIGURE 7(d)) is therefore identical whether pulse echo or through transmission is used. It is understood, of course, that the gate 76 or the differentiator 74 may include means for inverting either the positive or negative gating pulses, 75 or 88, if the gate 76 is of the type that triggers on pulses of only one polarity.

From the foregoing, it is seen that the invention provides improved methods and apparatus for detecting the level of molten metal during continuous casting processes. In addition to overcoming the disadvantages of the prior art methods, the invention supplies a system which reliably and continuously determines, through a sampling process, the level of the molten metal. Thus, with the present system, a substantially instantaneous corrective signal can be generated for application to conventional controlling means used in the casting process. In addition to the above advantages, the described methods and apparatus are especially workable in a high temperature environment which has heretofore precluded the utilization of conventional electroacoustic devices and methods.

Although the invention has been described with reference to specific embodiments thereof, it is understood that many substitutions, modifications and variations may be made within the skill of the art. For example, the acoustic transmitter or transmitters may be excited with a periodic signal, rather than with a pulse train. For this purpose, a conventional oscillator, operating at the resonant frequency of a transducer crystal, can be employed. All such substitutions, modifications and variations, therefore, are intended to be included within the scope and spirit of the invention as defined in the appended claims.

We claim:
1. A system for determining the level of a substance within the cavity of a reciprocating container which has longitudinal motion relative to the level of the substance, comprising:
   electroacoustic transducer means associated with the container for transmitting and receiving acoustic energy into and from the container cavity, respectively, to generate first electrical signals representative of the presence of the substance at a predetermined level within the container;
   means responsive to the motion of the container for developing a second electrical signal representing the displacement of the container from a longitudinal referenec position;
   and means jointly responsive to the first and second electrical signals for developing an output signal indicative of the level of the substance relative to the reference position of the container.

2. A system for determining the level of a substance within the cavity of a reciprocating container which has longitudinal motion relative to the level of the substance, comprising:
   electroacoustic transducer means associated with the container for transmitting and receiving acoustic energy into and from the container cavity, respectively;
   means for energizing the transducer means to effect the transmission of acoustic energy and the generation of corresponding first electrical signals when the level of the substance is displaced from a predetermined level within the container;
   means responsive to the motion of the container for developing a second electrical signal representing the displacement of the container from a longitudinal reference position;
   an output circuit;
   means responsive to the first electrical signals for developing a control signal;
   and means connected to pass the second electrical signal to the output circuit in response to the control signal.

3. A system in accordance with claim 2 in which:
   the transducer means is repetitively excited with bursts of electrical energy to ecect the transmission of corresponding bursts of acoustic energy;
   the motion of the container is reciprocative; and
   the repetition frequency of the acoustic energy bursts is substantially greater than the cyclic frequency of reciprocation.

4. A system as defined in claim 2, wherein:
   the second electrical signal is an analog signal; and
   the means for developing the control signal further includes
   means for generating a pulse having a duration corresponding to the duration of the first electrical signals, and
   further circuit means for producing control signals corresponding to initiation and extinction of the pulse, whereby the amplitude of the analog signal is sampled by the output circuit upon occurrence of the control signals.

References Cited
UNITED STATES PATENTS

| 2,763,040 | 9/1956 | Korb | 164—83 X |
| 2,905,989 | 9/1959 | Black | 164—155 |
| 3,204,460 | 9/1965 | Milnes | 164—277 X |
| 3,237,251 | 3/1966 | Thalmann | 164—154 X |
| 3,255,626 | 6/1966 | Van Der Veer | 73—67.8 X |
| 3,300,820 | 1/1967 | Tiskus et al. | 164—155 |
| 3,326,042 | 6/1967 | Ross et al. | 73—290 |

FOREIGN PATENTS

| 222,586 | 7/1959 | Australia. |
| 965,167 | 7/1964 | Great Britain. |

J. SPENCER OVERHOLSER, Primary Examiner

R. SPENCER ANNEAR, Assistant Examiner

U.S. Cl. X.R.

73—290; 164—4, 150; 340—244